United States Patent
Tracey et al.

(10) Patent No.: US 10,016,792 B2
(45) Date of Patent: Jul. 10, 2018

(54) PROCESSING TOOL CLEANING USING LASER ABLATION

(71) Applicant: The Boeing Company, Chicago, IL (US)

(72) Inventors: Ashley C. Tracey, Seattle, WA (US); Anthony M. Westren, Summerville, SC (US); Kay Y. Blohowiak, Issaquah, WA (US); Mark R. Brei, Ladson, SC (US); Tyler Jacob Zimmerman, Seattle, WA (US); Richard C. Barclay, Ladson, SC (US); Tara Kovacs Baker, Charleston, SC (US); Yuliya Shafranyuk, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 15/293,349

(22) Filed: Oct. 14, 2016

(65) Prior Publication Data

US 2018/0104726 A1   Apr. 19, 2018

(51) Int. Cl.
*B08B 7/00* (2006.01)

(52) U.S. Cl.
CPC ................... *B08B 7/0042* (2013.01)

(58) Field of Classification Search
CPC .................................................. B08B 7/0042
See application file for complete search history.

(56) References Cited

U.S. PATENT DOCUMENTS

| | | | |
|---|---|---|---|
| 5,643,367 A * | 7/1997 | Viel | B08B 7/0042 134/1 |
| 5,938,854 A | 8/1999 | Roth | |
| 6,497,826 B2 | 12/2002 | Li et al. | |
| 2014/0076354 A1 | 3/2014 | West et al. | |
| 2014/0272121 A1* | 9/2014 | Ng | B29C 33/3842 427/133 |

OTHER PUBLICATIONS

"Dyna-Tek DataSheet", Dyna-Tek, LLC, Retrieved from the Internet: http://www.dyna-tek.com/wp-content/uploads/2015/06/DynaTek-DT-6060-Mold-Release-Product-Data-Sheet.pdf ; Accessed on Oct. 4, 2016, 1 pg.

* cited by examiner

*Primary Examiner* — Sharidan Carrillo
(74) *Attorney, Agent, or Firm* — Kwan & Olynick LLP

(57) ABSTRACT

Provided are methods for cleaning processing tools from residue using laser ablation. Also provided are processing tools comprising non-metal base portions and protective optical layers that cover and shield these base portions from laser ablation. For example, a protective optical layer may reflect a laser beam used for ablating the tool. Methods of forming these protective optical layers on non-metal base portions are also provided. In some embodiments, this protective optical layer is the outermost layer exposed to the environment. Alternatively, the protective optical layer may be covered by a release layer. The release layer may be retained or removed during laser ablation. In some embodiments, light emitted by a processing tool during laser ablation is analyzed to determine performance of its protective optical layer. This feedback may be used to control the laser ablation such as to control orientation of the laser beam relative to the processing tool.

13 Claims, 11 Drawing Sheets

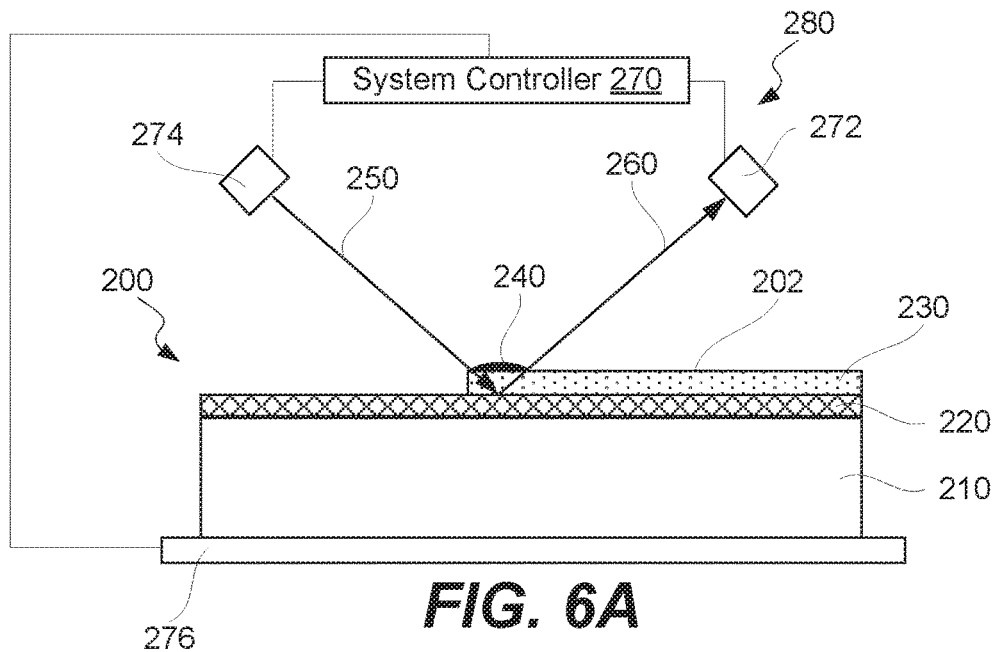
FIG. 6A
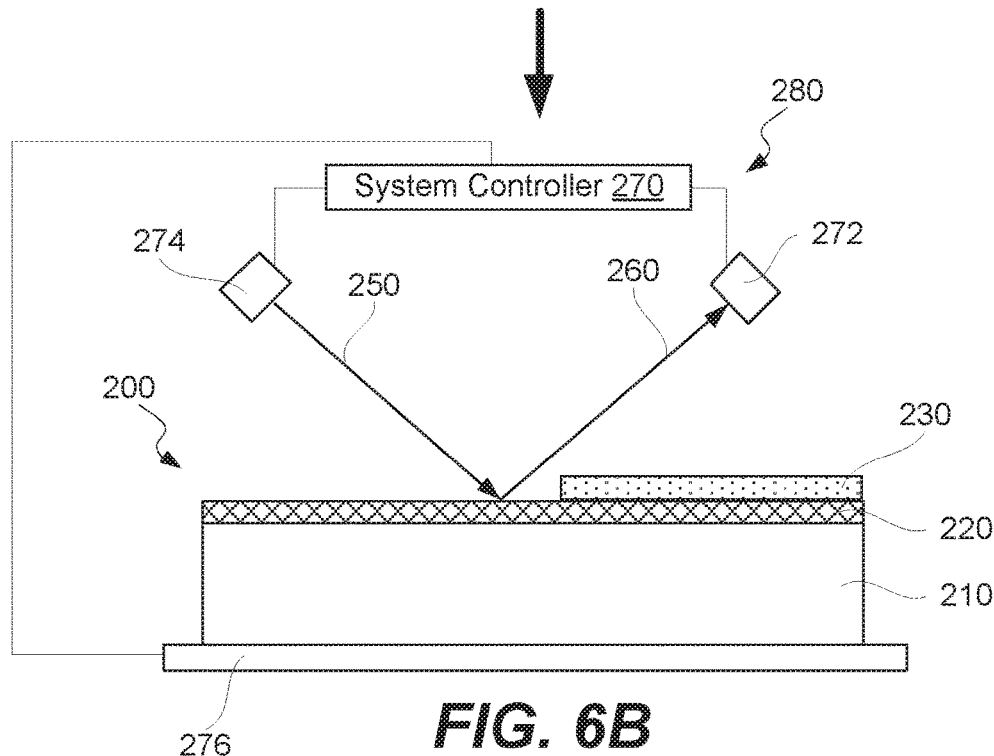
FIG. 6B

PROCESSING TOOL CLEANING USING LASER ABLATION

BACKGROUND

Various processing tools, such as molds and, in particular, molds used for forming (e.g., curing) composite parts, need to be periodically cleaned from residue that accumulates in these tools during their use. Traditional cleaning techniques involve abrasive removal (e.g., media blasting, sanding), chemical cleaning (e.g., solvent wiping), and the like. These techniques tend to be time consuming and have ergonomic concerns, such repetitive stress injuries. Furthermore, these techniques have various limitations and drawbacks. For example, media blasting has a high risk of foreign object damage (FOD). Sanding generally unable to all contours and radii. It is also generally difficult to determine a point when sanding pads need to be changed during automated sanding. Finally, abrasive techniques require consumables (e.g., sand paper, grit/media). Chemical cleaning techniques may also require specific infrastructure and have safety concerns (e.g., chemical exposure).

Another aspect of cleaning is preserving the tool integrity. For example, molds for curing composite parts may themselves be composite (e.g., to match coefficients of thermal expansion of the molded structures). These composite molds may utilize release coatings on their surfaces. Some cleaning methods, such as laser ablation, may be potentially damaging to these coating and/or the composite tools. As such, new processing tools and cleaning methods for these processing tools are needed to address these concerns.

SUMMARY

Provided are methods for cleaning processing tools from residue using laser ablation. Also provided are processing tools comprising non-metal base portions (e.g., composite base portions) and protective optical layers that cover and shield these base portions from laser ablation. For example, a protective optical layer may reflect a laser beam used for ablating the tool. Methods of forming these protective optical layers on non-metal base portions are also provided. In some embodiments, this protective optical layer is the outermost layer exposed to the environment. Alternatively, the protective optical layer may be covered by a release layer. The release layer may be retained or removed during laser ablation. In some embodiments, light emitted by a processing tool during laser ablation is analyzed to determine performance of its protective optical layer. This feedback may be used to control the laser ablation such as to control orientation of the laser beam relative to the processing tool.

In some embodiments, a method for cleaning a processing tool comprises providing the processing tool and exposing the surface of the processing tool to a laser beam. The processing tool comprises a base portion and a protective optical layer disposed over the base portion. The base portion may comprise a non-metal material, such as a composite material. In some embodiments, the base portion may be substantially all non-metal or, more specifically, composite. The protective optical layer blocks the laser beam from reaching the base portion. Exposing the surface to the laser beam ablates the residue away from the surface. The residue may be accumulated on the surface during prior uses of the processing tool, such as forming composite structures using this processing tool.

In some embodiments, exposing the surface to the laser beam comprises emitting a light by the processing tool. The light emitted by the processing tool may be at least in part reflected by the protective optical layer. The protective optical layer may comprise a reflective material, such as metal flakes or ceramic flakes (e.g., mica). More specifically, the reflective material may be selected from the group consisting of alumina flakes, stainless flakes, nickel flakes, and the like. These flakes may be dispersed in a base material, such as a polysilazane, sol-gel coating, epoxy, and the like. These optical aids would be incorporated into a matrix that enable them to be deposited as a coating onto the surface. This matrix can include epoxies, polymers, or sol-gel based matrices. In some embodiments, the protective optical layer comprises one or more absorbing materials, such as oxirane or, more specifically, oxirane, [[4-(1,1-dimethylethyl) phenoxy]methyl]- (available as CLEAR-WELD from J-B Weld Company in Sulphur Springs, Tex.). Similar to reflective properties, the absorptive properties may be used to protect the base portion and, in some embodiments, to indicate the presence (or absence) of the protective optical layer. In some embodiments, the protective optical layer comprises one or more scattering materials, such as titania (titanium oxide). Furthermore, various combinations of the reflective, absorptive, and/or scattering materials.

Prior to exposing the surface of the processing tool to the laser beam, the processing tool may also comprise a release layer disposed over the protective optical layer and forming the surface of the processing tool. The release layer may be transparent to the laser beam and to the light reflected by the protective optical layer. The release layer may be retained (e.g., at least partially) while exposing the surface to the laser beam. Alternatively, the release layer is removed while exposing the surface to the laser beam. In these embodiments, the method further comprises forming a replacement release layer over the protective optical layer after removing the release layer. The release layer may comprise a material selected from the group consisting of silicone (e.g., polysiloxanes) release agents, fluoropolymer resin, and polysilazane resin.

Alternatively, the protective optical layer forms the surface of the processing tool. In other words, the protective optical layer is exposed to the environment and is not covered by any other layers. In this example, the protective optical layer comprises a release material selected from the group consisting of silicone (e.g., polysiloxanes) release agents, fluoropolymer resin, and polysilazane resin. In some embodiments, the protective optical layer comprises a reflective material, absorptive material, and/or scattering material, various examples of which are listed above. The reflective material is in a form selected from the group consisting of particles, flakes, and rods. The reflective material may be uniformly dispersed within the reflective material of the protective optical layer. Alternatively, the reflective material may be concentrated near the surface of the processing tool.

In some embodiments, the method further comprises monitoring the light emitted by the processing tool. This monitoring operating comprises determining a point when the protective optical layer is stopped being blocked by the residue, which in turn may involve determining a point when the protective optical layer is directly exposed to the laser beam. This latter determining operation may comprise determining a point when the release layer is removed from the protective optical layer. In these embodiments, prior to exposing the surface of the processing tool to the laser beam, the release layer may be disposed over the protective optical layer and forms the surface of the processing tool. Furthermore, prior to removing the release layer from the surface of the processing tool, the light emitted by the processing tool may be at least partially emitted by the release layer. Also, prior to removing the release layer from the surface of the processing tool, the release layer may at least party block the laser beam from exposing the protective optical layer. In some embodiments, prior to removing the release layer from the surface of the processing tool, the release layer at least partially blocks a light emitted by the protective optical layer when the laser beam exposes the protective optical layer.

The release layer may be removed while exposing the protective optical layer. In some embodiments, the method further comprises forming a replacement release layer over the protective optical layer after removing the release layer.

In some embodiments, monitoring the light emitted by the processing tool comprises determining wavelength of the light emitted by the processing tool. The wavelength of the light emitted by the processing tool changes when the protective optical layer becomes exposed while exposing the surface of the processing tool to the laser beam.

In some embodiments, the method further comprises forming the protective optical layer on the base portion. The method may further comprise forming a composite part using the processing tool, wherein forming the composite part leaves the residue on the surface of the processing tool. The composite part may be fiber-reinforced polymer (FRP). More specifically, the composite part may be selected from the group consisting of bismaleimide carbon fiber reinforced polymer (CFRP), epoxy CFRP, benzoxazine FRP, and the like. The base portion of the processing tool may be fiber-reinforced polymer (FRP). More specifically, the base portion may be selected from the group consisting of bismaleimide carbon fiber reinforced polymer (CFRP), epoxy CFRP, benzoxazine FRP, and the like These and other embodiments are described further below with reference to the figures.

BRIEF DESCRIPTION OF THE DRAWINGS

FIGS. 6A-6D are schematic illustrations of a processing tool (initially having a release layer) during different stages of a cleaning method that involves removal of the original release layer while monitoring emitted light from the tool and forming a new release layer, in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Provided processing tools that may include non-metal base portions, e.g., composite base portions, and can be safely cleaned using laser ablation or any other like high energy sources. Also provided are methods of forming these tools and methods for cleaning these tools using laser ablation. These tools and methods address various limitations and drawbacks of traditional cleaning techniques described above. Specifically, a processing tool includes a protective optical layer disposed over a base portion of the tool. During cleaning of this tool, the protective optical layer blocks a laser beam (used for ablation of any residue on the surface of the tool) from reaching the base portion thereby preventing degradation of the base portion and increasing the operating life of the tool. The protective optical layer may be permanent and retained after laser ablation. Alternatively, the protective optical layer may be removed during laser ablation. This removal may alter the light emitted by the tool during laser ablation, which in turn may be detected by a sensor. Furthermore, the processing tool may include a release layer disposed over the protective optical layer, which may be either retained or removed during laser ablation. In some embodiments, the protective optical layer may be a reflector for the laser beam. Furthermore, the protective optical layer or a combination of the protective optical layer and release layer may be operable as an optical sensor. Regardless of functionality of the protective optical layer and release layer (if one is present), any residue formed on the tool is removed during laser ablation without damaging the base portion. In addition to preserving the tool, this laser ablation approach also addresses processing speed, quality issues, and ergonomic/safety concerns associate with conventional cleaning techniques.

Figure 1A:
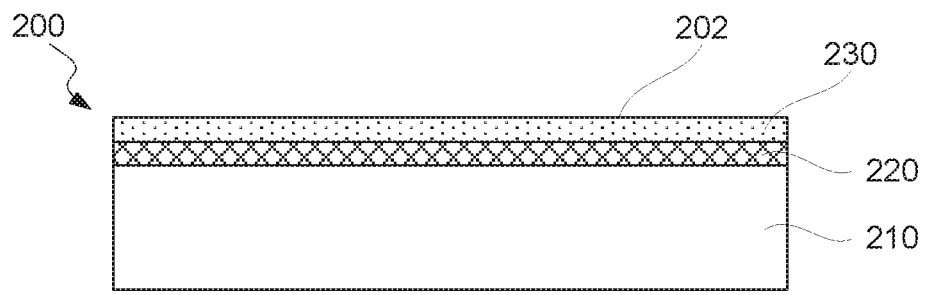
FIGS. 1A and 1B are schematic illustrations of two examples of a processing tool.
Figure 1B:
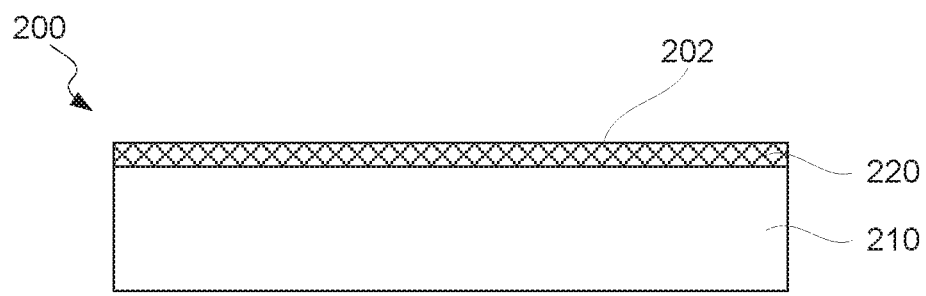

FIGS. 1A and 1B illustrate two examples of processing tool 200. In both examples, processing tool 200 comprises base portion 210 and protective optical layer 220 disposed over base portion 210. More specifically, protective optical layer 220 may directly interface base portion 210 and/or adhered to base portion 210.

In the example illustrated in FIG. 1A, processing tool 200 also comprises release layer 230. Release layer 230 is disposed over protective optical layer 220. More specifically, release layer 230 is the outermost layer of processing tool 200 forming its surface 202. In this example, protective optical layer 220 is disposed between base portion 210 and release layer 230. Protective optical layer 220 may directly interface both base portion 210 and release layer 230, just one of these components, or neither one.

Release layer 230 is optional. In the example illustrated in FIG. 1B, processing tool 200 does not include release layer 230. In these embodiments, protective optical layer 220 may be the outermost layer forming surface 202 of processing tool 200. Protective optical layer 220 in the example illustrated in FIG. 1B may be different from protective optical layer 220 in the example illustrated in FIG. 1A. For example, protective optical layer 220 in the example illustrated in FIG. 1B may be also operable as a release layer and, as such, have a different composition.

Protective optical layer 220 is operable to block a laser beam from reaching base portion 210 when processing tool 200 is being cleaned using laser ablation. This blocking function may be achieved by reflecting the laser beam. In this example, protective optical layer 220 may perform in accordance with one or more of the following options. First, the protective optical layer may be reflective to the laser beam. For example, the protective optical layer may comprise a reflective material, such as metal flakes or ceramic flakes (e.g., mica). More specifically, the reflective material may be selected from the group consisting of alumina flakes, stainless flakes, nickel flakes, and the like. Second, the protective optical layer may be absorptive to the laser beam. For example, the protective optical layer may comprise oxirane or, more specifically, oxirane, [[4-(1,1-dimethylethyl)phenoxy]methyl]- (available as CLEARWELD from J-B Weld Company in Sulphur Springs, Tex.). Third, the protective optical layer may diffract the laser beam. For example, the protective optical layer may comprise titania (titanium oxide).

In some embodiments, protective optical layer 220 comprises a release material selected from the group consisting of silicone (e.g., polysiloxanes) release agents, fluoropolymer resin, and polysilazane resin.

In some embodiments, the protective optical layer 220 comprises a reflective material, various examples of which are listed above The reflective material is in a form selected from the group consisting of particles, flakes, and rods. The reflective material may be uniformly dispersed within the reflective material of the protective optical layer 220. Alternatively, the reflective material may be concentrated near surface 202 of processing tool 200.

In some embodiments, protective optical layer 220 is operable as an optical sensor. Specifically, protective optical layer 220 may be removed during cleaning. The light emitted by processing tool 200 or, more specifically, the light emitted by a portion of processing tool that is being ablating, may change when protective optical layer 220 is removed from this portion. The emitted light is captured by a sensor that directs the laser beam of the laser ablation system to a new portion of processing tool that still has protective optical layer 220.

Base portion 210 may be non-metal or, more specific, composite or 3D printed plastic. One example of a composite material suitable for base portion 210 is fiber-reinforced polymer (FRP). Other examples include, but are not limited to, bismaleimide carbon fiber reinforced polymer (CFRP), epoxy CFRP, benzoxazine FRP, and the like. Many non-metal materials or, more specifically, composite materials readily absorb laser radiation, which can lead to damage if not protected. In some embodiments, base portion 210 is metal.

Release layer 230, when one is used, may comprise silicone (e.g., polysiloxanes) release agents, fluoropolymer resin, and polysilazane resin. Specific examples include FREKOTE® (dibutyl ether and naphtha) available from Henkel Corporation in Rocky Hill, Conn. or ZYVAX® FLEX-Z (2,2,4-trimethylpentane and naphtha) available from Chem-Trend LP in Howell, Mich.

It should be noted that processing tool 200 and its component, in particular, protective optical layer 220, are capable of surviving temperatures of at least 300 Fahrenheit or, more specifically, at least 360 Fahrenheit or, more specifically, or even at least 400 Fahrenheit.

Furthermore, protective optical layer 220 is conformable to high contour surfaces of base portion 210. This conformity ensures that entire base portion 210 is covered by protective optical layer 220.

Figure 2A:
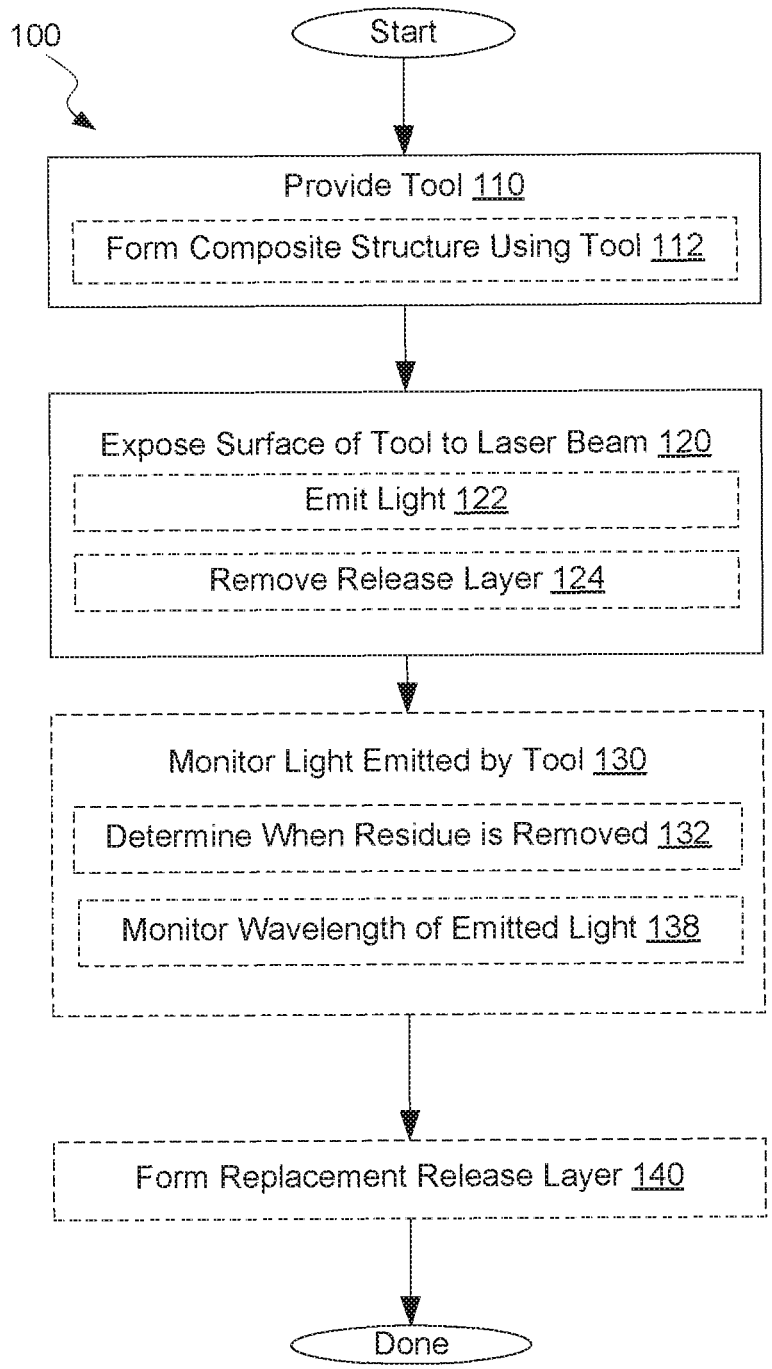
FIG. 2A is a process flowchart corresponding to a method for cleaning a processing tool from residue using laser ablation, in accordance with some embodiments.

FIG. 2A is a process flowchart of method 100 for cleaning processing tool 200 from residue using laser ablation, in accordance with some embodiments. Various examples of processing tool 200 are described above with reference to FIGS. 1A and 1B. In some embodiments, method 100 may commence with providing processing tool 200 during operation 110. When processing tool 200 is provided, it may contain residue 240 as, for example, schematically shown in FIG. 3A. One having ordinary skill in the art would understand that the presence of residue 240 is optional and, in some cases, processing tool 200 may be substantially free from residue 240 when provided. The surface cleaning operations may be performed regardless on this processing toll 200 as a part of the overall processing scheme and to ensure that there is no residue left of surface 202 of processing tool 200 regardless of the initial state of processing tool 200.

In some embodiments, operation 110 involves forming a composite part using processing tool 200, which is shown as optional operation 112 in FIG. 2A. For example, processing tool 200 may be a mold used to form the composite part during its curing in an oven. Some examples of composite parts formed by processing tool 200 include but are not limited to fiber-reinforced polymer (FRP) or, more specifically, bismaleimide carbon fiber reinforced polymer (CFRP), epoxy CFRP, benzoxazine FRP, and the like. These composite parts may be for automotive and/or aerospace applications. Some examples of these composite parts include, but not limited to, stiffeners, skins, brackets, and widgets.

During operation 112, processing tool 200 may be subjected to a temperature of between 70° Fahrenheit and 500° Fahrenheit or, more specifically, between 80° Fahrenheit and 400 Fahrenheit, such as 365° Fahrenheit during this operation. Furthermore, processing tool 200 may be subjected to a pressure of between 0 psi and 200 psi or, more specifically, between 10 psi and 100 psi. Processing tool 200 or, more specifically, its protective optical layer 220 are design to withstand these processing conditions. In some embodiments, protective optical layer 220 is protected by release layer 230 during this operation. Finally, residue 240 may be formed on surface 202 of processing tool 200 during this operation and as, for example, schematically shown in FIG. 3A. Residue 240 may be a matrix resin oozing out of the composite part during its processing and other types of residues. In some embodiments, residue 240 comprises resin flash and release agent.

Method 100 may proceed with exposing surface 202 of processing tool 200 to a laser beam, which is shown as operation 120 in FIG. 2A. This exposure ablates any residue 240 that may be on surface 202 of processing tool 200. As such, this cleaning technique may be referred to as laser ablation. For purposes of this disclosure, laser ablation is defined as a process of removing residue 240 and, in some embodiments, also removing protective optical layer 220 and/or release layer 230 by irradiating it with a laser beam. Depending on the intensity of laser, residue 240 is heated by the absorbed laser energy and evaporates or sublimates or it may be even converted into a plasma.

During this exposure to the laser beam, protective optical layer 220 blocks the laser beam from reaching base portion 210, at least while protective optical layer 220 is retained over base portion 210. In some embodiments, protective optical layer 220 is removed as a part of this operation and some minimal exposure of base portion 210 may happen before the laser beam is directed to another portion of processing tool 200 that still has protective optical layer 220.

The blocking properties of protective optical layer 220 are achieved using a specific composition and other properties of protective optical layer 220. As noted above, these blocking properties may be reflective, absorptive, scattering, and various combinations thereof.

Figure 3A:
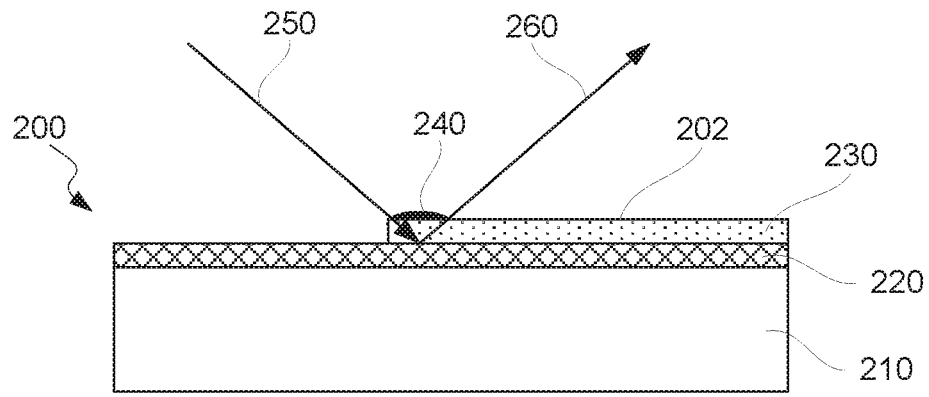
FIGS. 3A-3C are schematic illustrations of a processing tool (initially having a release layer) during different stages of a cleaning method that involves removal of the original release layer and forming a new release layer, in accordance with some embodiments.

When exposed to laser beam 250, processing tool 200 may emit light from surface 202, which is shown as operation 122 in FIG. 2A. Emitted light 260 is schematically shown in FIG. 3A and other figures. The properties of emitted light 260 may depend on protective optical layer 220. For example, protective optical layer 220 may be reflective to laser beam 250 directed to processing tool 200. In this example, emitted light 260 may be reflected light 252 and, more specifically, may have the same frequency as laser beam 250. The intensity of reflected light 252 depends on a portion of laser beam 250 absorbed by processing tool 200 and any residue 240 positioned on surface 202 of processing tool 200.

In some embodiments, prior to exposing surface 202 of processing tool 200 to the laser beam during operation 120, processing tool 200 may also comprise release layer 230 disposed over protective optical layer 220. In these embodiments, release layer 230 forms surface 202 of processing tool 200. Release layer 230 may be transparent to the laser beam and to the light reflected by protective optical layer 220.

Figure 3B:
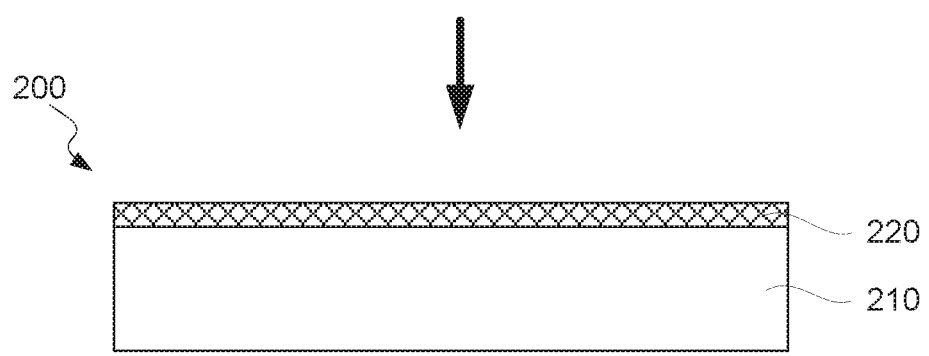
Figure 3C:
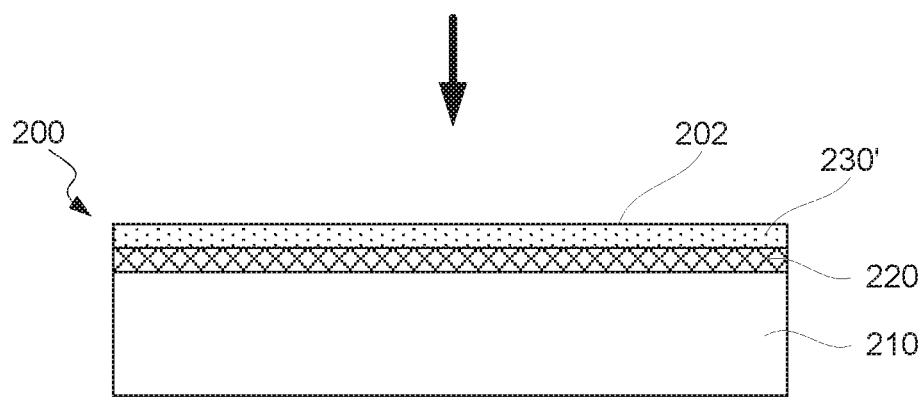

When release layer 230 is present prior to commencing operation 120, this release layer 230 may be removed during operation 120 (while exposing the surface 202 to the laser beam) as, for example, shown in FIG. 2A by optional operation 124. Protective optical layer 220 may be retained. Different processing stages of the example when release layer 230 is removed while exposing processing tool 200 are schematically illustrated in FIGS. 3A-3C. Specifically, FIG. 3A illustrates processing tool 200 while a portion of processing tool 200 covered by residue 240 is being exposed. The exposure of this portion just started such that residue 240 and release layer 230 forming a portion of surface 202 still remains. In this example, laser beam 250 may move from left to right along surface 202. One having ordinary skills in the art would understand that prior to the exposure, protective optical layer 220 may be fully covered by release layer 230. During the exposure, laser beam 250 ablates both residue 240 and release layer 230. However, protective optical layer 220 remains and blocks laser beam 250 from reaching base portion 210. FIG. 3B illustrates processing tool 200 after release layer 230 and all reside 240 is removed. At this stage, surface 202 of processing tool 200 is formed by protective optical layer 220. Prior to using this processing tool 200, replacement release layer 230' may be formed over protective optical layer 220 as shown in FIG. 3C and further described below with reference to optional operation 140.

Figure 4A:
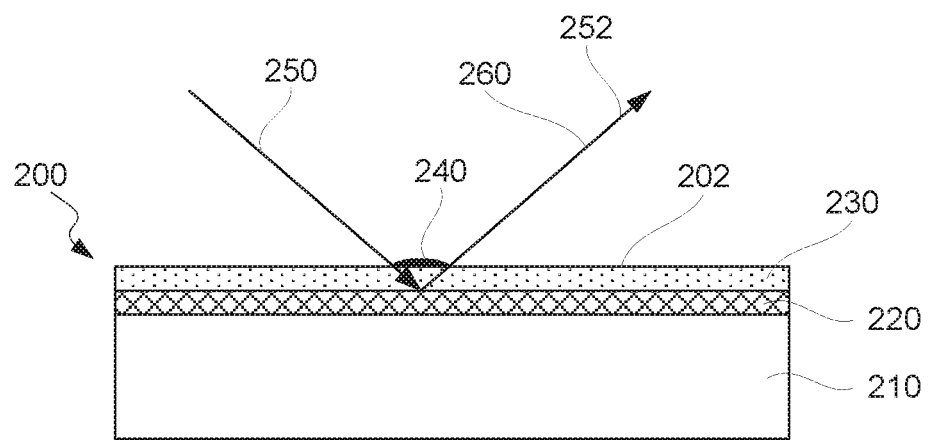
FIGS. 4A-4B are schematic illustrations of a processing tool during different stages of a cleaning method during which the release layer is retained, in accordance with some embodiments.
Figure 4B:
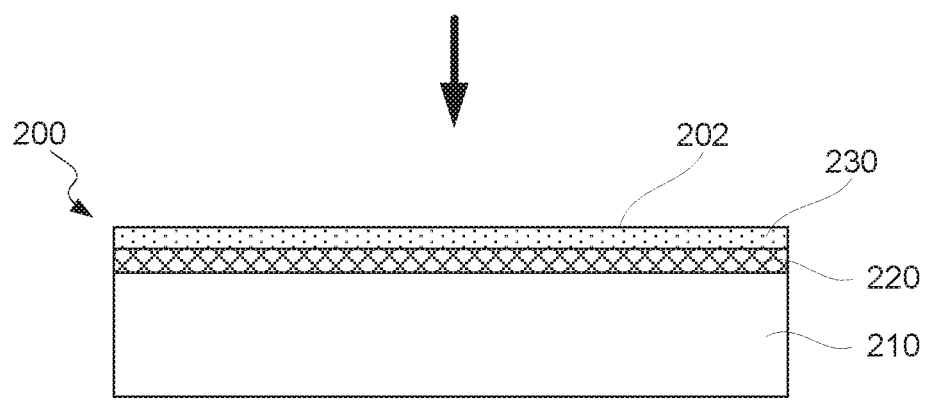

Alternatively, release layer 230 may be retained while processing tool 200 is exposed to the laser beam and operation 124 is not performed or happen. These embodiments are schematically illustrated in FIGS. 4A-4B. Specifically, FIG. 4A illustrates processing tool 200 while processing tool 200 is being exposed. The exposure ablates residue 240 but retains release layer 230 as, for example, shown in FIG. 4B. It should be noted that some changes may happen within release layer 230 as a part of this exposure but release layer 230 is still functional and can be used for another processing cycle.

Figure 5A:
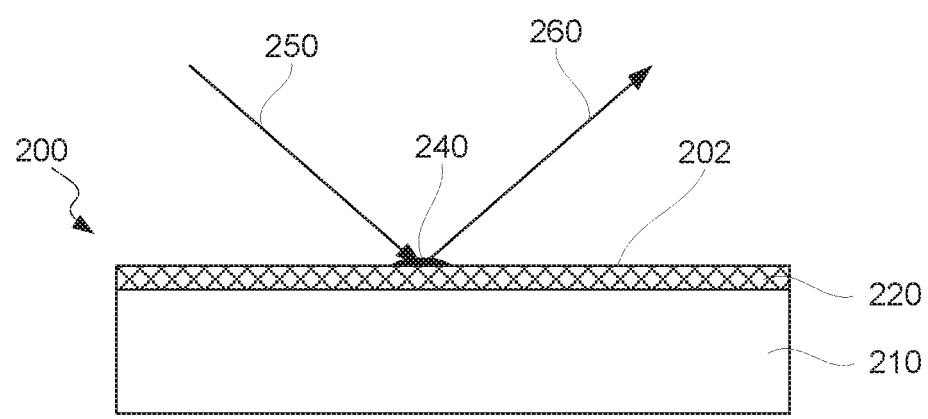
FIGS. 5A-5B are schematic illustrations of a processing tool (having an exposed protective optical layer) during different stages of a cleaning method, in accordance with some embodiments.
Figure 5B:
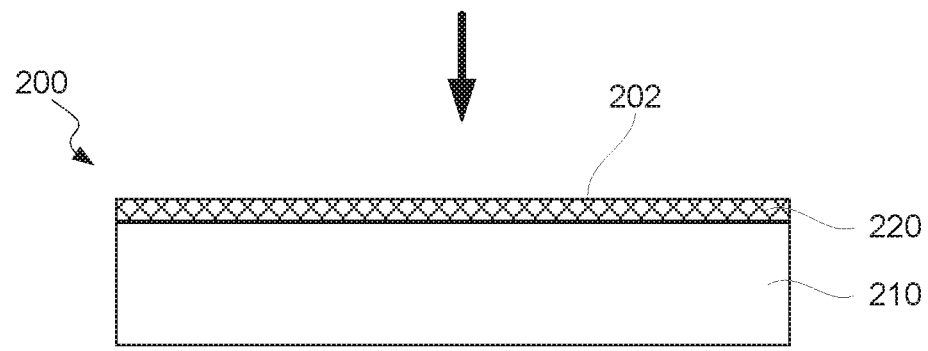
Figure 6C:
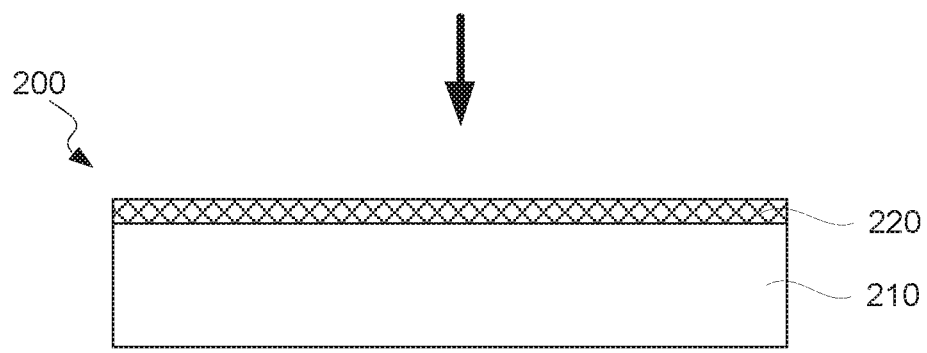
Figure 6D:
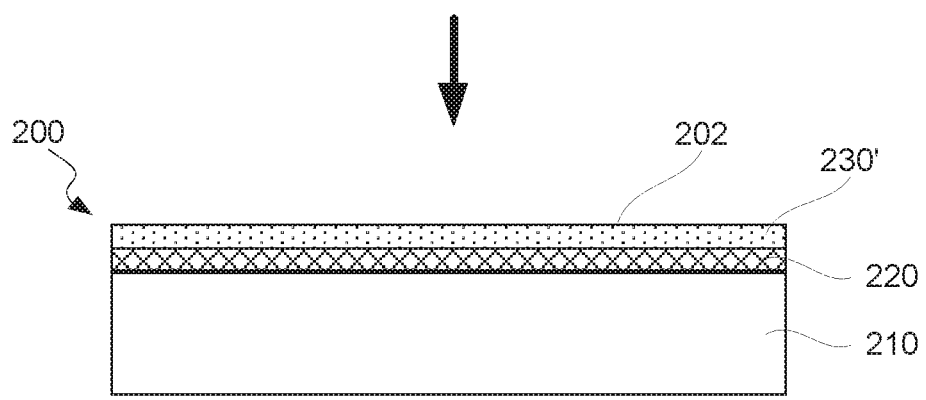

Furthermore, in some embodiments, processing tool 200 may not have a separate release layer as, for example, schematically illustrated in FIGS. 5A-5B. In these embodiments, protective optical layer 220 forms surface 202 of processing tool 200 and incorporated some release materials. In other words, protective optical layer 220 may be the outermost layer and may be exposed to the environment and residues. Protective optical layer 220 may include, for example, one or more of silicone (e.g., polysiloxanes) release agents, fluoropolymer resin, and polysilazane resin.

In some embodiments, method 100 further comprises monitoring light emitted by processing tool 200 as shown in FIG. 2A with optional operation 130. FIGS. 6A-6B and 7A-7B illustrate various components of system 280 used for monitoring and also for ablation. For example, system 280 may include sensor 272 positioned to capture at least a portion of emitted light 260 and to determine various characteristics of this emitted light 260. Sensor 272 may be coupled to system controller 270 that uses input from sensor 272 to control operation of laser 274 and/or positioning device 276. Positioning device 276 controls orientation of processing tool 200 relative to laser 274 or, more specifically, relatively to laser beam 250. Specifically, positioning device 276 may be coupled to processing tool 200 and move processing tool 200 (as schematically shown in FIGS. 6A-6B and 7A-7B). Alternatively, positioning device 276 may be coupled to laser 274 or be a part of laser 274. In some embodiments, positioning device 276 is one or more galvomirrors of laser 274.

In some embodiments, monitoring the emitted light involves monitoring the wavelength of the emitted light as shown in FIG. 2A with optional operation 138. The wavelength may depend on presence/absence of various layers over base structure 210. For example, the wavelength may change when ablation removes one or both of protective optical layer 220 and release layer 230. Furthermore, the wavelength may change when the residue is removed.

Figure 7A:
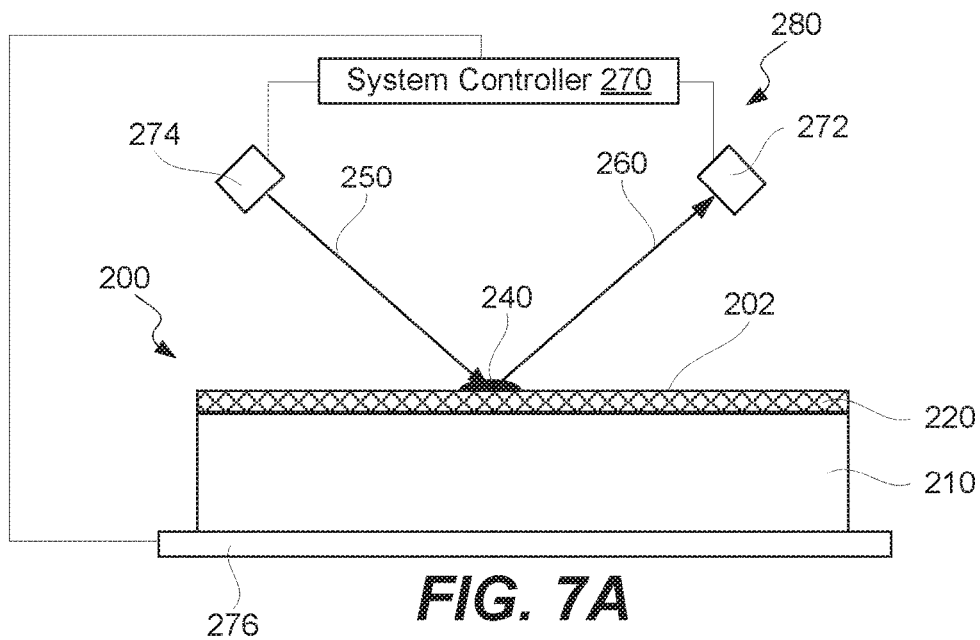
FIGS. 7A-7B are schematic illustrations of a processing tool (having an exposed protective optical layer) during different stages of a cleaning method that involves monitoring emitted light from the tool, in accordance with some embodiments.
Figure 7B:
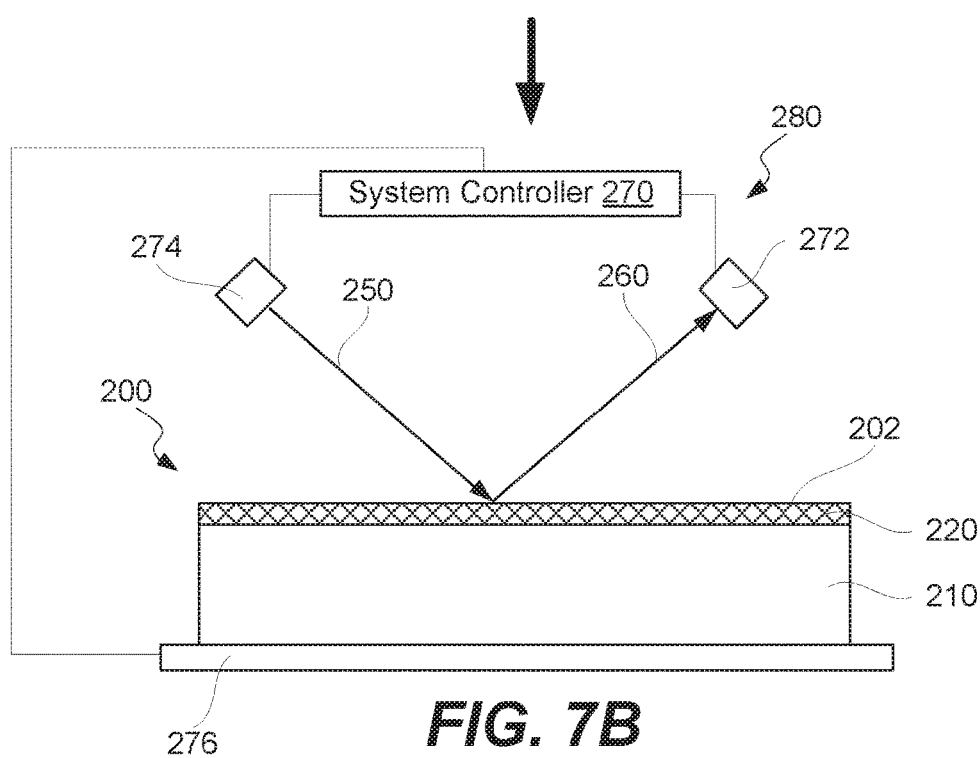

In some embodiments, monitoring operation 130 may comprises determining a point in time when residue 240 is removed from the protective optical layer 220 as shown in FIG. 2A with optional operation 132. Referring to FIGS. 7A and 7B, one or more characteristics of emitted light 260 may change when residue 240 is removed, e.g., going from the stage illustrated in FIG. 7A to the stage illustrated in FIG. 7B. In the later stage, residue 240 no longer blocks or reflects laser beam 250 and no longer interferes or contributes to emitted light. The point in time determined during operation 132 may occur when protective optical layer 220 is directly exposed to the laser beam. More specifically, this point in time may be when release layer 230 is removed from protective optical layer 220 as schematically shown in FIGS. 6A and 6B. Specifically, one or more characteristics (e.g., wavelength) of the emitted light may change when release layer 230 is removed. For example, prior to removing release layer 230, release layer 230 may at least party block the laser beam from exposing protective optical layer 220. Furthermore, release layer 230 (while it still present) may at least partially block the light emitted by protective optical layer 220. Both of these phenomena may trigger the change in the emitted light. At the same time, these change in these characteristics may be monitored (during optional operation 138) and used to control the ablation system, such as directing the laser beam to a new location where release layer 230 is still present.

In some embodiments, method 100 further comprises forming replacement release layer 230' over protective optical layer 220 as shown in FIG. 2A with optional operation 140. Specifically, replacement release layer 230' may be formed after removing the release layer 230 as schematically shown in FIGS. 3B-3C and FIGS. 6C-6D.

Also provided is a method of forming processing tool 200. FIG. 3B illustrates a flowchart corresponding to method 150. Method 150 may comprise providing base portion 210 during operation 152 and forming protective optical layer 220 over base portion 210 during operation 154. As noted above, protective optical layer 220 is operable to block laser beam from reaching base portion 210 during laser ablation of processing tool 200. Various examples of protective optical layer 220 and base portion 210 are described above. Forming protective optical layer 220 over base portion 210 may be performed using coating.

In some embodiments, method 150 further comprises forming release layer 230 over protective optical layer 220 during optional operation 156. In these embodiments, release layer 230 forms surface 202 of processing tool 200. Various examples of release layer 230 are described above. Forming release layer may be performed using coating.

Figure 2B:
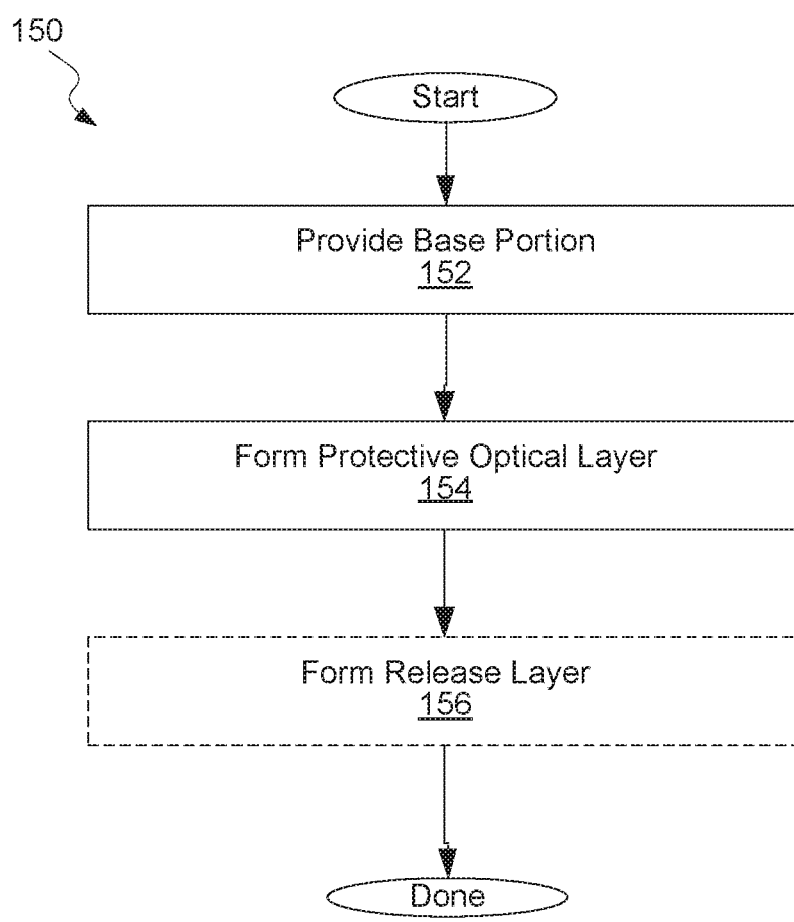
FIG. 2B is a process flowchart corresponding to a method for forming a processing tool that can be cleaned using laser ablation, in accordance with some embodiments.

It should be noted that operation 156 in FIG. 2B may be same as operation 140 in FIG. 2A. Furthermore, operations of methods 100 and 150 may be combined to form a single unified method.

Figure 8:
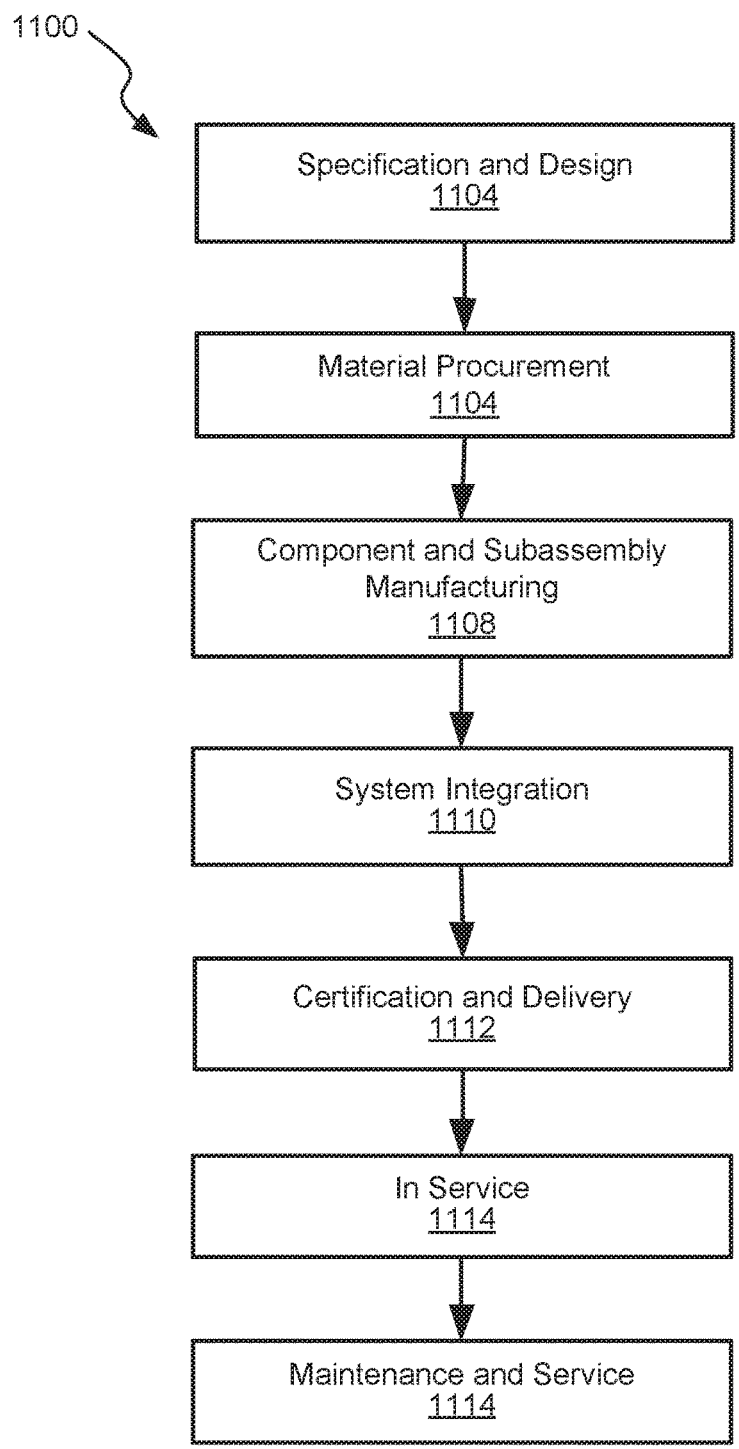
FIG. 8 is a block diagram of aircraft production and service methodology that may utilize methods and systems for cleaning processing tools from residue using laser ablation described herein.
Figure 9:
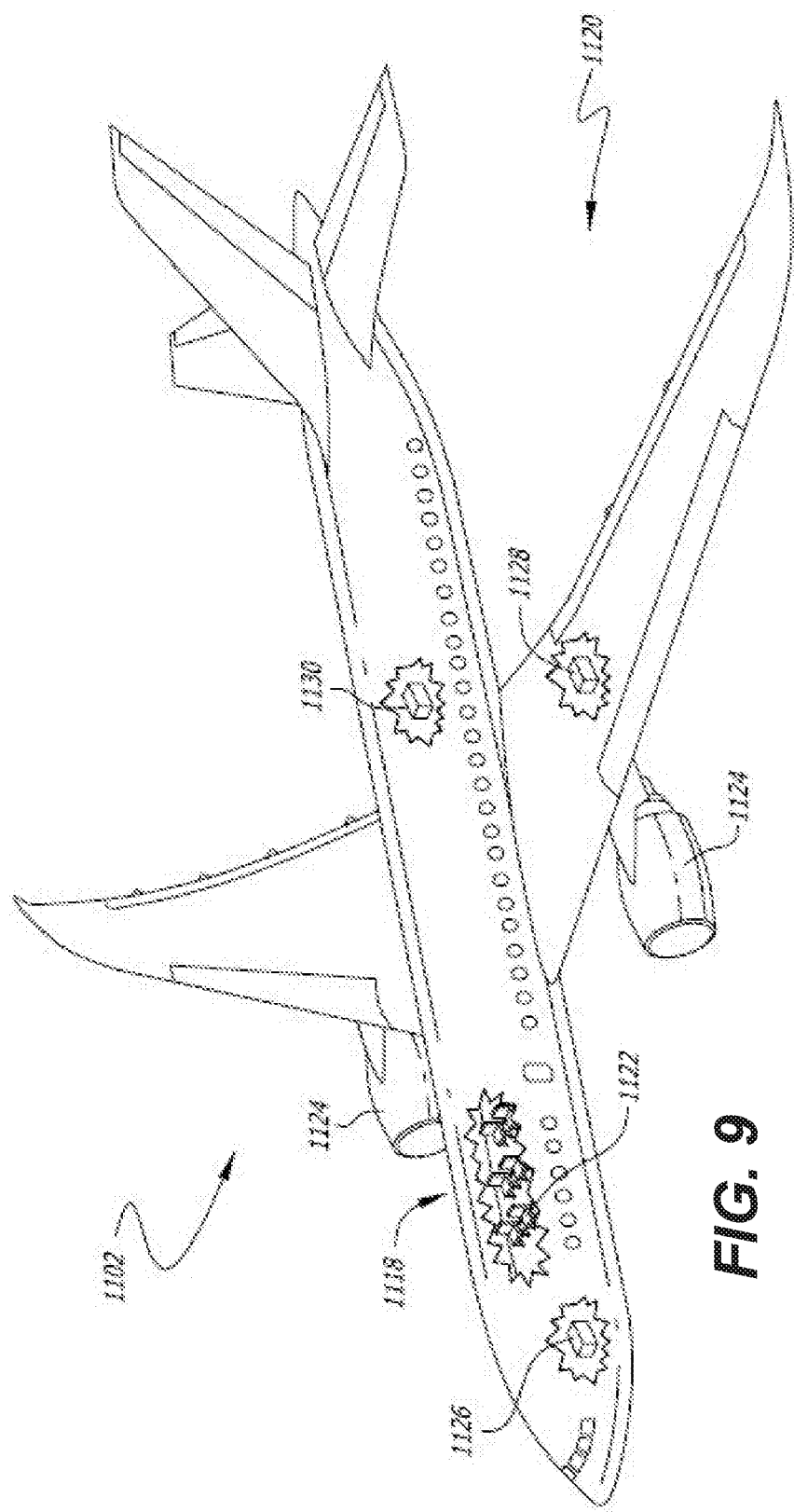
FIG. 9 is a schematic illustration of an aircraft that may include composite parts described herein.

Examples of the present disclosure may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Methods for cleaning processing tools from residue using laser ablation may be performed during one or more of these stages. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102.

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on. The described methods (e.g., methods for cleaning processing tools from residue using laser ablation) and systems may be used on during specification and design (block 1104) of aircraft 1102 and component and subassembly manufacturing (block 1108). For example, various non-metal parts or, more specifically, composite parts used for airframe and interior may be fabricated using processing tools that are cleaned using from residue using laser ablation in accordance with methods described herein.

As shown in FIG. 12, aircraft 1102 produced by illustrative method 1100 may include airframe 1118 with a plurality of high-level inspection systems 1120 and interior 1122, which may include the one or more flush mountable bottle openers. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (bock 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for cleaning residue using laser ablation from a mold used for forming composite parts, the method comprising:
    providing the mold comprising a base portion, a protective optical layer disposed over the base portion, and a release layer disposed over the protective optical layer and forming a surface of the mold;
        wherein the base portion comprises a non-metal material, and
        wherein the release layer comprises a material selected from the group consisting of a silicone release agent, a fluoropolymer resin, and a polysilazane resin; and
    exposing the surface of the mold to a laser beam,
        wherein the protective optical layer comprises a reflective material and blocks the laser beam from reaching the base portion, and
        wherein exposing the surface comprises emitting a light by the mold and ablating the residue away from the surface,
        wherein the light emitted by the mold is at least in part reflected by the protective optical layer.

2. The method of claim 1, wherein the reflective material is selected from the group consisting of metal flakes and ceramic flakes.

3. The method of claim 1, wherein the release layer is transparent to the laser beam.

4. The method of claim 1, wherein the release layer is retained while exposing the surface to the laser beam.

5. The method of claim 1, wherein the release layer is removed while exposing the surface to the laser beam.

6. The method of claim 1, further comprising monitoring the light emitted by the mold.

7. The method of claim 1, wherein exposing the surface of the mold to the laser beam comprises removing the release layer from the protective optical layer and further comprising forming a replacement release layer over the protective optical layer after removing the release layer.

8. The method of claim 6, wherein monitoring the light emitted by the mold comprises determining the wavelength of the light emitted by the mold.

9. The method of claim 6, further controlling a position of the mold relative to the laser beam based on monitoring the light emitted by the mold.

10. The method of claim 8, wherein the wavelength of the light emitted by the mold changes when the protective optical layer becomes exposed, while exposing the surface of the mold to the laser beam.

11. The method of claim 8, wherein determining the wavelength of the light emitted by the mold comprises monitoring changes in the wavelength to determine when the residue is ablated away from the surface.

12. The method of claim 11, wherein exposing the surface of the mold to the laser beam comprises removing the release layer from the protective optical layer, and wherein determining the wavelength of the light emitted by the mold further comprises monitoring changes in the wavelength to determine when the release layer is removed from the protective optical layer.

13. A method for cleaning residue using laser ablation from a mold used for forming composite parts the method comprising:
    providing the mold comprising a base portion and a protective optical layer disposed over the base portion and forming a surface of the mold,
        wherein the base portion comprises a non-metal material, and
        wherein the protective optical layer comprises a release material selected from the group consisting of a silicone release agent, a fluoropolymer resin, and a polysilazane resin; and
    exposing the surface of the mold to a laser beam,
        wherein the protective optical layer blocks the laser beam from reaching the base portion, and
        wherein exposing the surface comprises emitting a light by the mold and ablating the residue away from the surface,
        wherein the light emitted by the mold is at least in part reflected by the protective optical layer.

* * * * *